United States Patent
Gomberg et al.

(10) Patent No.: US 12,330,507 B2
(45) Date of Patent: *Jun. 17, 2025

(54) AUXILIARY ELECTRICAL TRACTION MOTOR FOR VEHICLES

(71) Applicant: Solaredge Technologies Ltd., Herzeliya (IL)

(72) Inventors: Bryon Gomberg, Kfar Saba (IL); Yakir Loewenstern, Ariel (IL); Ilan Yoscovich, Givatayim (IL); Guy Sella, Bitan Aharon (IL); Rachel Prishkolnik, Tel Mond (IL); Julie Horn, Tel Aviv (IL); Dragan Mikulec, Erlangen (DE)

(73) Assignee: Solaredge Technologies Ltd., Herzeliya (IL)

( * ) Notice: Subject to any disclaimer, the term of this patent is extended or adjusted under 35 U.S.C. 154(b) by 4 days.

This patent is subject to a terminal disclaimer.

(21) Appl. No.: 18/494,994

(22) Filed: Oct. 26, 2023

(65) Prior Publication Data

US 2024/0059156 A1      Feb. 22, 2024

Related U.S. Application Data

(63) Continuation of application No. 16/935,350, filed on Jul. 22, 2020, now Pat. No. 11,833,906.

(Continued)

(51) Int. Cl.
*B60L 15/20*   (2006.01)
*B60K 1/00*   (2006.01)
*B60L 50/00*   (2019.01)

(52) U.S. Cl.
CPC ............ *B60L 15/20* (2013.01); *B60K 1/00* (2013.01); *B60L 50/00* (2019.02)

(58) Field of Classification Search
CPC ............ B60L 15/20; B60L 50/00; B60K 1/00; B60K 1/02; B60K 7/0007; Y02T 10/70; Y02T 10/72

See application file for complete search history.

(56) References Cited

U.S. PATENT DOCUMENTS 4,021,690 A * 5/1977 Burton .................... B60B 3/02
                                                                  310/67 R
4,566,710 A * 1/1986 Furukawa ............ B62D 7/1545
                                                                  180/410

(Continued)

FOREIGN PATENT DOCUMENTS

EP          2371646 A1      10/2011

OTHER PUBLICATIONS

Nov. 23, 2020—EP EESR—EP 20187145.6.

(Continued)

*Primary Examiner* — Hung Q Nguyen
*Assistant Examiner* — Sherman D Manley
(74) *Attorney, Agent, or Firm* — Banner & Witcoff, Ltd.

(57) ABSTRACT

A vehicle traction device having at least one energy storage component; at least one traction component; at least one acceleration sensor including a pressure sensor, a motion sensor, a gyroscopic sensor, an accelerometer, and/or a piezoelectric sensor; and at least one deceleration sensor including a pressure sensor, a motion sensor, a gyroscopic sensor, an accelerometer, and/or a piezoelectric sensor. The at least one acceleration/deceleration sensor is responsive to an operator input, and when the operator input is applied to the at least one acceleration/deceleration sensor, the energy traction device is signaled to transfer energy from the at least one energy storage component to the forward propulsion of the vehicle, or vice versa, using the at least one traction (Continued)

component. The vehicle traction device may be incorporated into, for example, a wheel, a motor, and/or a transmission.

20 Claims, 5 Drawing Sheets

Related U.S. Application Data

(60) Provisional application No. 62/876,837, filed on Jul. 22, 2019.

(56) References Cited

U.S. PATENT DOCUMENTS

| | | | | |
|---|---|---|---|---|
| 4,761,577 A * | 8/1988 | Thomas | ............... | H02K 7/1846 |
| | | | | 310/67 A |
| 5,894,902 A * | 4/1999 | Cho | ..................... | B60L 3/0061 |
| | | | | 310/67 R |
| 6,802,385 B2 * | 10/2004 | Pyntikov | ................. | B60L 53/80 |
| | | | | 180/220 |
| 6,836,035 B1 * | 12/2004 | Pawletko | ............. | H02K 37/06 |
| | | | | 310/68 B |
| 7,497,285 B1 * | 3/2009 | Radev | ..................... | B60K 6/52 |
| | | | | 180/65.23 |
| 8,668,035 B2 | 3/2014 | Bradley et al. | | |
| 8,700,239 B2 * | 4/2014 | Perry | ..................... | B60K 6/48 |
| | | | | 310/67 R |
| 8,723,344 B1 | 5/2014 | Dierickx | | |
| 9,702,443 B2 | 7/2017 | Erlston et al. | | |
| 9,718,343 B2 * | 8/2017 | Atkins | ................. | H02K 7/1815 |
| 9,963,137 B2 * | 5/2018 | Perry | ..................... | H02K 15/14 |
| 10,005,352 B2 * | 6/2018 | Aich | ..................... | B60K 7/0007 |
| 10,075,050 B2 * | 9/2018 | Perry | ................... | H02K 19/103 |
| 10,183,563 B2 | 1/2019 | Rayner et al. | | |
| 10,300,870 B2 | 5/2019 | Da Silva Carvalho et al. | | |
| 11,833,906 B2 * | 12/2023 | Gomberg | ................ | B60L 15/20 |
| 2004/0007302 A1 * | 1/2004 | Hamilton | ............. | B60C 23/041 |
| | | | | 152/416 |
| 2006/0255663 A1 | 11/2006 | Vlad | | |
| 2008/0308328 A1 * | 12/2008 | Kejha | ................. | B60L 15/2045 |
| | | | | 180/243 |
| 2011/0246005 A1 * | 10/2011 | King | ................. | B60W 50/0097 |
| | | | | 180/65.265 |
| 2012/0161497 A1 | 6/2012 | He et al. | | |
| 2014/0358340 A1 * | 12/2014 | Radev | ................... | B60W 10/26 |
| | | | | 180/65.265 |
| 2016/0068055 A1 * | 3/2016 | Wolf-Monheim | ...... | B60L 58/21 |
| | | | | 180/65.51 |
| 2019/0111790 A1 | 4/2019 | Crombez et al. | | |
| 2019/0140230 A1 * | 5/2019 | Gu | ........................... | B60K 1/04 |
| 2019/0351895 A1 * | 11/2019 | Ben-Ari | .................. | B60K 6/26 |
| 2020/0072290 A1 * | 3/2020 | Gunji | ..................... | F16C 19/52 |
| 2021/0362543 A1 * | 11/2021 | Howard | ............... | B60T 8/1761 |

OTHER PUBLICATIONS

F. Sherosky, "Protean Electric to present value of in-wheel traction motors at the 2011 SAE World Congress," Torque News, Mar. 2011, accessed from https://www.torquenews.com/119/protean-electric-present-value-wheel-traction-motors-2011-sae-world-congress.

* cited by examiner

AUXILIARY ELECTRICAL TRACTION MOTOR FOR VEHICLES

CROSS-REFERENCE TO RELATED APPLICATIONS

This application is a continuation of U.S. application Ser. No. 16/935,350, filed Jul. 22, 2020, which claims priority to U.S. Provisional Ser. No. 62/876,837 filed Jul. 22, 2019, the disclosures of which are hereby incorporated by reference in their entireties.

BACKGROUND

The present disclosure relates to the field of electrical traction motors for vehicles.

Vehicles, such as automobiles, may comprise an internal combustion engine (ICE) and/or an electrical traction motor (ETM). The ICE or ETM may be connected to a transmission, thereby driving wheels of the vehicle in a rotational motion that advances the vehicle. When using an ETM, the vehicle and/or engine may, for example, comprise power electronics for controlling the motor (such as an inverter with an integrated controller) and/or energy storage (such as a high-capacity battery). Brakes incorporated into the wheels may be operated by a lever in the vehicle, such that when the lever is pressed the brakes in the wheel are actuated and the vehicle is slowed down and/or stopped. When an accelerator pedal is pressed, a signal may be transferred to the engine or motor to apply more power to the wheels. The engine or motor may be located within the vehicle chassis, such as under a front or rear bonnet. The wheels may be attached to a wheel hub using wheel lugs, and the wheel hub may comprise, for example, the drive shaft and/or brakes. Tires may be attached to rims of the wheels.

SUMMARY

The following is a short summary of some of the inventive concepts for illustrative purposes only and is not an extensive overview, and is not intended to identify key or critical elements or to limit or constrain the inventions and examples in the detailed description. One skilled in the art will recognize other novel combinations and features from the detailed description.

According to aspects disclosed herein, components of a vehicle, such as wheels, may comprise a self-contained traction system, such as comprising energy harvesting components, electric motors (or equivalent conversion devices), energy storage components, power/control electronics and/or controllers. Sensors, such as in communication with the controllers of the wheels, may be placed at the operator controls, and the sensor readings may be used by the wheel's controller to choose between using the self-contained traction system and using the vehicle traction system, such as an internal combustion engine (ICE). For example, the wheels of a vehicle may be replaced with traction motor wheels that comprise energy storage and electronics/mechanics for transfer of the stored energy to the wheel during certain conditions, such as during slow speeds or a traffic jam. For example, a mechanical flywheel incorporated into the wheel may store energy and act as a motor.

The flywheel may act as a rotor, where the stator may be the wheel hub and/or wheel rim. The wheel may transfer the angular momentum of the flywheel to the vehicle using the operation of the electromagnets in sequence. For example, the wheels of a vehicle may comprise batteries, electronics, and an electric hub motor/generator, where the hub motor/generator stores electrical energy in the battery and later uses the electrical energy to assist in advancing the vehicle. For example, the internal combustion engine (ICE) and/or transmission of a vehicle may be replaced with an electrical traction motor, electronics, and a battery occupying the same space as the ICE and/or transmission. In this example, the same connectors to the operator controls may be used, thereby converting the vehicle to a battery electric vehicle or hybrid powertrain.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. In the drawings, like numerals reference similar elements.

DETAILED DESCRIPTION

Figure 1:
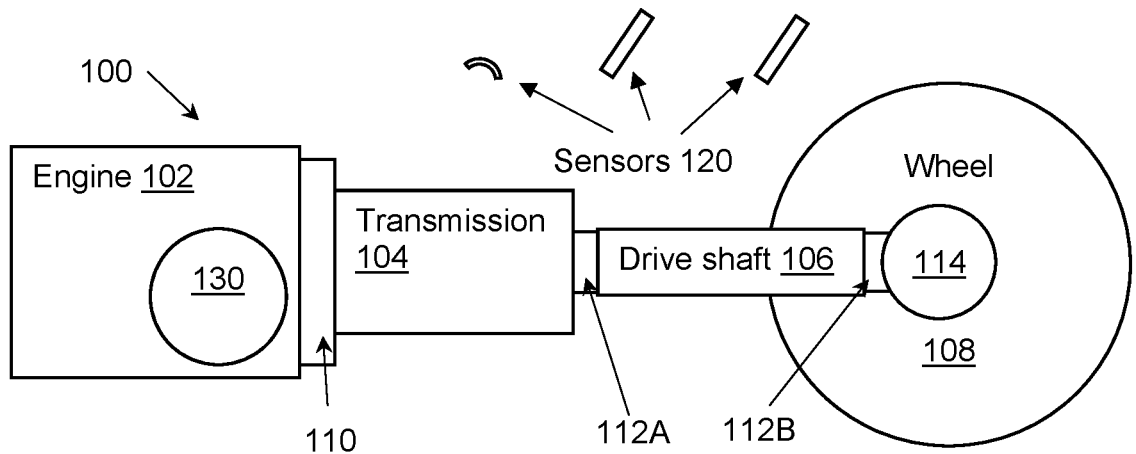
FIG. 1 shows, schematically, a vehicle drivetrain including components for auxiliary traction motor placement.

The accompanying drawings, which form a part hereof, show examples of the disclosure. It is to be understood that the examples shown in the drawings and/or discussed herein are non-exclusive and that there are other examples of how the disclosure may be practiced.

In internal combustion engine (ICE) vehicles, the incorporation of electrical traction motors for improved efficiency may be challenging. For example, the vehicle might not be designed for such modifications. For example, a retrofit device cost including installation may cost more than a new electric vehicle (EV). The solutions disclosed herein provide a self-contained energy conversion and storage system, which may replace existing components of a vehicle, thereby adding an electrical traction system. Self-contained electrical traction motors, such as a vehicle traction device, may be incorporated into a vehicle engine, transmission, drivetrain (e.g. transaxle, differential, shaft, and/or joints), or wheels to convert an ICE vehicle into a hybrid vehicle, reduce emissions on ICE vehicles, or extend the range of a vehicle. For example, an aftermarket set of wheels for the vehicle may comprise electric motors/generators, electronics, and batteries for energy storage. For example, a vehicle transmission may be replaced with a transmission incorporating one or more electric motors, electronics, and batteries within the replacement transmission. For example, an ICE and transmission may be replaced with an electric motor, electronics, planetary gear, and battery.

Aspects of the disclosure relate to a vehicle traction device, such as a vehicle wheel, rim, wheel and tire combination, etc., where the vehicle traction device comprises at least one energy storage component, at least one traction component, at least one sensor, and a controller. For example, the energy storage component may be a battery, a super-capacitor, a flywheel, etc. At least one traction component, such as a traction motor, may be engaged to propel the vehicle forward, such as by a controller monitoring sensor(s), sensor(s) connected to an engagement control circuit, etc. Sensors may be incorporated into the user controls, such as pressure sensors, velocity sensors, yaw-rate sensors, position/location sensors, acceleration sensors, gyroscopic sensors, piezoelectric sensors, etc., and a circuit or controller monitoring the sensors may determine to engage the traction device to propel the vehicle forward.

For example, the controller is configured to monitor sensor values, and responsive to the sensors values, direct the conversion of energy between the energy storage component (i.e. battery) and the traction component (i.e. electric motor). For example, the energy storage component may be a flywheel that stores kinetic energy, and the kinetic energy may be transferred to or from the vehicle rim and tire using magnets, selectively activated to transfer energy using magnetic attraction and repulsion.

For example, at least one acceleration sensor may be connected to the gas pedal, such as a pressure sensor, a motion sensor, an accelerometer, a piezoelectric sensor, etc. For example, at least one deceleration sensor may be connected to the brake pedal, such as a pressure sensor, a velocity sensor, a yaw-rate sensor, a position/location sensor, an acceleration sensor, a gyroscopic sensor, a piezoelectric sensor, etc. The acceleration sensor may be responsive to an operator input, and when the input is applied, the traction component is signaled to transfer energy from the energy storage component to increase a velocity of the vehicle. Similarly, one or more deceleration sensors may be responsive to an operator input, and when said the input is applied, the traction component is signaled to transfer energy to the energy storage component from the forward moment of the vehicle, thereby reducing the vehicle velocity.

When more than one vehicle traction device is used on a vehicle, sensors may assist in the coordination and operation of the devices. For example, a yaw rate sensor may provide a measurement of the rotation around a vertical axis to assist in providing power to each vehicle traction device. For example, a pressure sensor may provide a measurement of the brake fluid pressure in the master brake cylinder. For example, a transverse acceleration sensor may provide a measurement of the transverse acceleration, such as when driving with a crosswind, or along a curved stretch of road. For example, four speed sensors may measure the speed of each wheel. For example, a steering wheel angle position sensor may provide a measurement of the steering angle in response to an input from the driver. For example, an electronic control unit (ECU) may perform processing of the sensor signals and calculate as power to provide to each vehicle traction device and control signals to other vehicle components, such as actuators.

A hydraulic power unit may implement commands of the ECU. For example, a hydraulic power unit may control the respective brake cylinder operation independently of the input from the driver. For example, brake pressure may be monitored by the hydraulic power unit, or the ECU. For example, the hydraulic power unit may receive a command to pre-charge a pump/charging piston unit of the hydraulic power unit. For example, when the brake is not actuated by the driver, the hydraulic power unit pressure may build-up pressure in the brake cylinder to allow enough pressure for breaking operation An energy transfer component may be used to convert kinetic energy between the traction component and the vehicle. For example, a motor, a generator, a combined motor and generator, an induction charging system, and/or a magnetic-flywheel converter system may be used to convert between kinetic and electrical energy. Some energy harvesting methods may be used to collect energy, such as solar, regenerative braking, induction charging, etc., and the energy may be stored in the energy storage device. For example, an acceleration of the vehicle, at least in part, may be provided to increase the state of charge of the energy storage device, such as by using a clutch and generator.

An operator device, such as a gas pedal, a brake pedal, etc. of a vehicle, may be used to signal the conversion of electrical energy between the at least one traction component (such as an electric motor) and the at least one energy storage component (such as a battery).

When a vehicle has power steering enabled by an ICE power, and the ICE is shut down when axillary traction motors are enabled, a steering sensor may be used. For example, a steering sensor (such as a pressure sensor, a velocity sensor, a yaw-rate sensor, a position/location sensor, an acceleration sensor, a gyroscopic sensor, a piezoelectric sensor, etc.) may be responsive to an operator steering input. When the operator steering input is received, a controller may be signaled to enable auxiliary power supply to a power steering energy device (such as from a battery to the power steering hydraulic pump, etc.) For example, using a relay to supply power to the power steering pump.

A vehicle traction device (motor, energy conversion, energy storage, etc.) may be incorporated into a drivetrain component of the vehicle. For example, the traction motor may be incorporated into a differential, a gearbox, a driveshaft, a transmission, an ICE, etc. For example, an electric motor, control electronics, and energy storage may be incorporated into an axle to provide power to the wheels, such as an e-axle for providing supplemental power to the wheels.

The energy storage component(s) may be a secondary battery (such as Li-ion battery, etc.), a flywheel, a compressed gas energy storage, a super-capacitor, a fuel cell, etc. The vehicle traction device may be configured for a land vehicle, such as a car, bus, van, pickup, off-road vehicle, truck, earth-mover, tractor, trailer, etc. The vehicle traction device may be incorporated into a wheel, and the wheel configured to propel a specific vehicle make and model during a traffic jam for a limited time (i.e. up to the limit of the energy storage component). The vehicle traction device may be included in a kit, such as a kit of four vehicle traction wheels configured for a Smart® Fortwo®. For example, the kit may include four vehicle traction devices, sensors, and a control unit, where the sensors are installed on the vehicle controls, and the control unit collects the sensor data and sends operational commands to the vehicle traction devices.

Energy storage may be added outside of the wheels. For example, the combined volume of the energy storage components, such as batteries, may be physically larger than the space available in the wheel, and a portion of the batteries may be located outside the wheel. For example, a battery may be added to the energy storage of a traction device by using an electrical conductor and connector. For example, an additional battery may be located in a compartment adjacent to the wheel.

Energy storage may be used during a driving for providing power to auxiliary vehicle systems, such as cooling, heating, wipers, etc. For example, an energy storage component external to the wheels may be added to an ICE vehicle to provide power to the power steering when the ICE is shut down during a traffic jam. For example, an energy storage component external to the wheels may be added to an ICE vehicle to provide power to the air conditioning when the ICE is shut down during a traffic jam. Similarly to these examples, power may be provided from an additional energy storage component to the heater, wipers, power brakes, or other vehicle components that may be needed during the operation of the traction device(s)

Besides increasing fuel efficiency for ICE vehicles, the vehicle traction device may be incorporated into other kinds of vehicles, such as hybrid (HEV) or electric vehicles (EV). As used herein, the term vehicle means an ICE, HEV, EV or other land vehicle with any combination of motors/engines. A vehicle traction device may allow increasing the range or efficiency of a vehicle so that better utility may be made out of each charge. For example, the vehicle traction device may increase the range of a vehicle. For example, the vehicle traction device may increase the fuel efficiency of a vehicle to comply with fuel efficiency regulations, such as city regulations, local regulations, regional regulations, country regulations, and/or export regulations.

A traction device may comprise a geographic location sensor, such as a global positioning device (GPS) sensor, and the controller of the traction device may alter the operation of the traction device based on input from the location sensor. For example, when a vehicle enters a particular region that requires a change in vehicle emissions, such as low emission zones, zones with certain environmental regulations (noise and/or pollution), etc., the control unit may apply the traction device(s) to propel the vehicle, and thereby reduce the emissions for the vehicle. For example, a company may purchase a fleet of vehicles from two or more brands, and use a GPS sensor incorporated into a traction device to monitor the combined locations of the fleet vehicles of the two brands.

Reference is now made to FIG. 1, which shows, schematically, a vehicle drivetrain 100 including components for auxiliary traction motor placement. An internal combustion engine (ICE) 102 is coupled to a transmission 104 using a clutch 110. ICE 102 may contain an auxiliary electrical traction motor 130, or be completely replaced by electrical traction motor 130. Similarly, transmission 104 may contain electrical traction motors (not shown), or ICE 102 and transmission 104 may be replaced with an electrical traction motor (not shown). Transmission 104 is coupled to a driveshaft 106 with u-joint 112A, and a second u-joint 112B couples driveshaft 106 to a differential 114. Transmission 104, driveshaft 106, and/or differential 114 may contain one or more electrical traction motors, such as a replacement transaxle comprising an electrical traction motor. Differential 114 is coupled to the wheel 108, either or both of which contain electrical traction motors (not shown). Sensors 120 may be connected to, for example, an accelerator pedal, a brake pedal, and/or a steering wheel. For example, values from sensors 120 may be used to determine when a controller should operate any of the electrical traction motors (130 and motors not shown). For example, a sensor may be a motion sensor, pressure sensor, a velocity sensor, a yaw-rate sensor, a position/location sensor, an acceleration sensor, a gyroscopic sensor, and/or a piezoelectric sensor.

Figure 2:
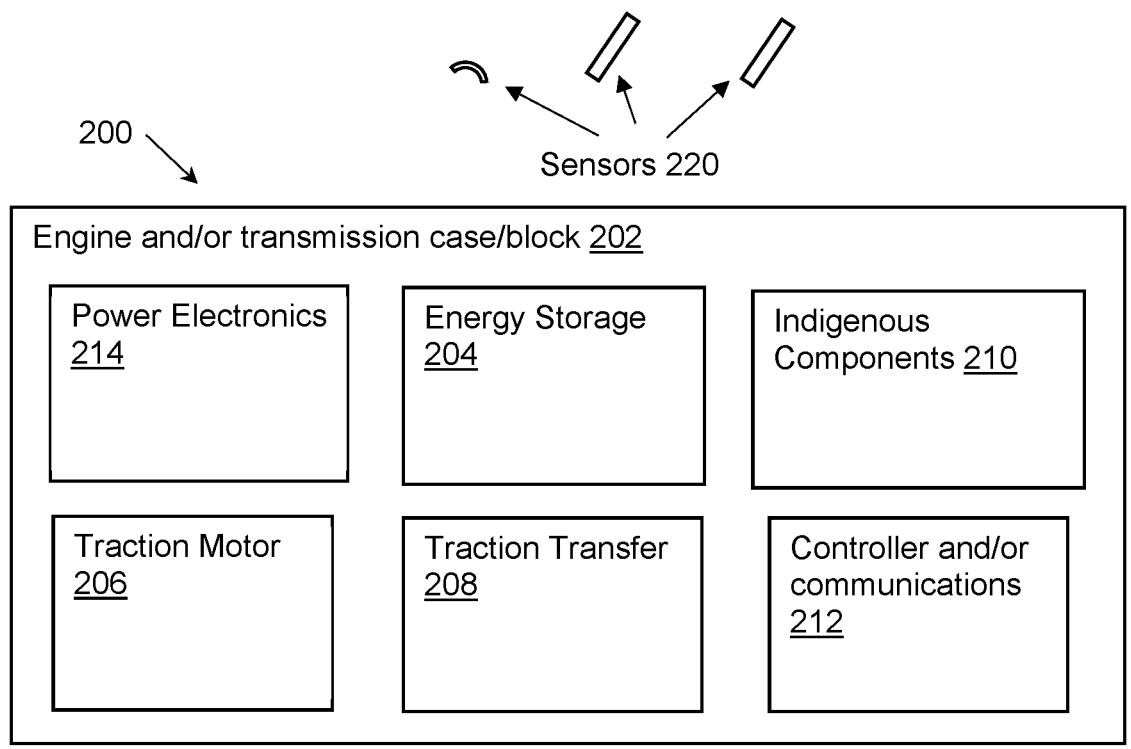
FIG. 2 shows, schematically, a vehicle engine and/or transmission with auxiliary traction motor components.

As used herein, the terms controller and controller circuit mean an electronic component configured to implement one or more functions, such as a method and/or a rule, to operate and control one or more other electronic circuits. For example, a controller may be a central processing unit, a micro-processor, an embedded controller, a digital hard-wired logic circuit, an application specific instruction set processor, an application specific integrated circuit, a multi-core processor, and/or a field programmable gate array (FPGA). The controller (or controller circuit) may interpret and execute instructions that, for example, may be stored in memory (such as hardware-based digital storage, RAM, ROM, optical disk) accessible by the controller, stored as software in a repository and/or hardwired in digital logic or an FPGA. For example, an apparatus may comprise a controller (e.g., a processor) and memory storing instructions, that when executed by the controller, cause the apparatus to implement one or more functions, such as those described in FIGS. 2 and 6 and any other function described herein Reference is now made to FIG. 2, which shows, schematically, a vehicle engine and/or transmission 200 with auxiliary traction engine components. The electrical traction motor components are enclosed inside the case/block 202, such as a housing, of the engine and/or transmission. The engine/transmission components include a traction motor 206 with optional traction transfer 208 components, such as a transmission, planetary gear, clutch, ratchet, and/or lock pins. Energy is provided from an energy storage 204, and is conditioned (such as converted to alternating current power) for traction motor 206 operation using power electronics 214. Power electronics 214 may include the controller (such as one or more hardware processors), communication modules 212, and/or power conversion circuits. Controller and/or communication module 212 may be in a separate component. Other components of the engine and/or transmission may be included (not shown), such as the components that perform the mechanical couplings, such as clutch, transmission, and/or structural functions. Sensors 220 may be used to receive operator input and respond using the electric motor and other components. For example, when an operator presses on a brake pedal, a brake pedal sensor 220 may determine that the braking force is low, such as less than 10 newton (N), and use regenerative braking through traction transfer 208, and use traction motor 206 to convert the mechanical braking to electrical energy, and power electronics 214 may then use the energy to charge the energy storage 204. An acceleration sensor 220 attached to the acceleration pedal may determine that the vehicle is in a traffic jam based on the low pressure on the pedal and the speed of the vehicle, and operate traction motor 206 using power electronics 214 and energy storage 204 to propel the vehicle forward slightly. An energy storage device or component may be a secondary battery (such as a rechargeable battery), a flywheel, a compressed gas energy storage, a supercapacitor, and/or a fuel cell.

Indigenous components 210 of the engine and/or transmission 200 may be replaced, modified, or removed. For example, when the electrical traction motor replaces the ICE, there might not be need for a transmission. In this example, the ICE is replaced and the transmission is modified to a planetary gear that corresponds to the operational characteristics of the electrical traction motor. In a replacement wheel example, the functions of the wheel may be included in the replacement component, such as a rim, a tire, a brake disk, and/or a central bearing.

Figure 3:
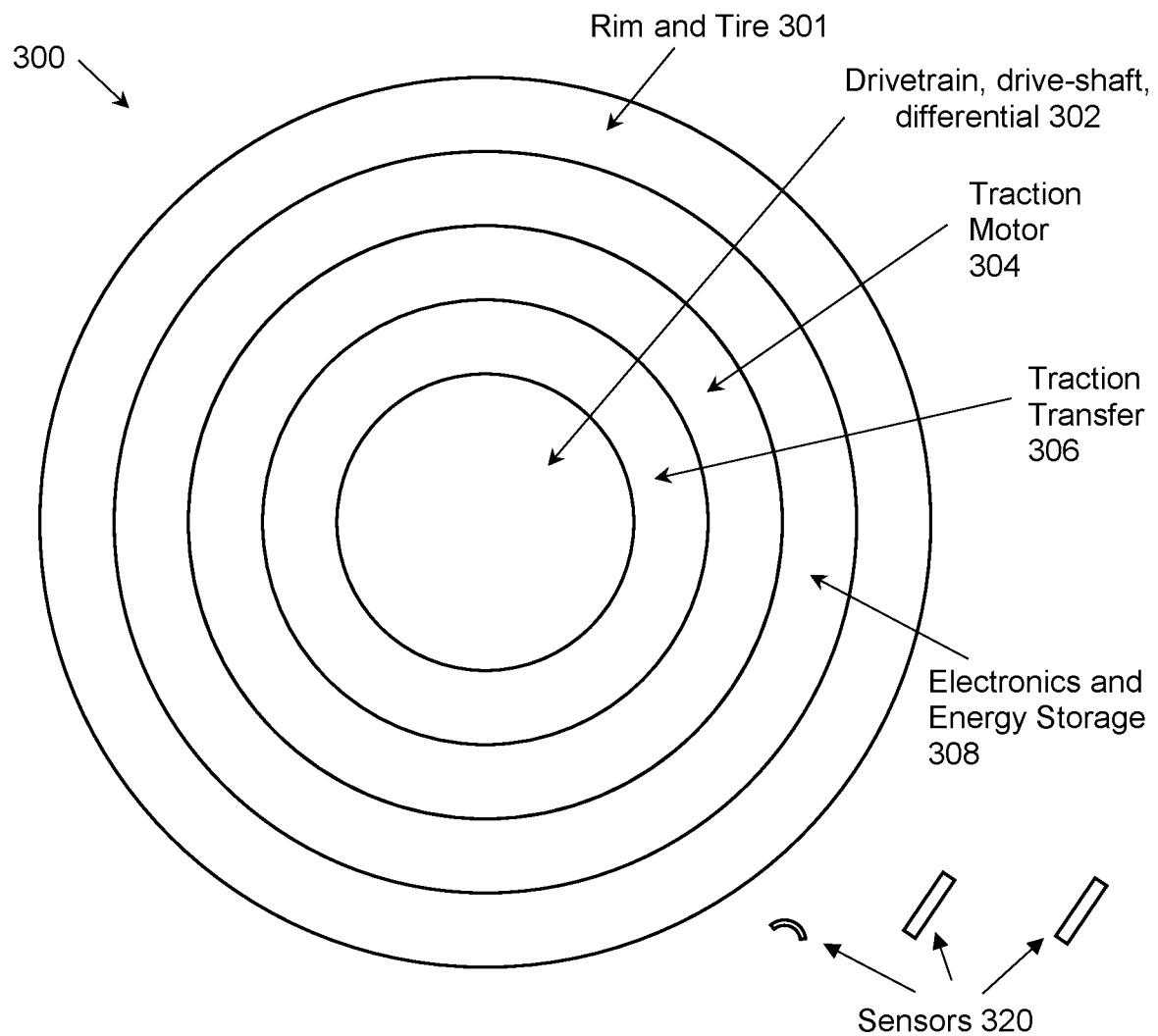
FIG. 3 shows, schematically, a vehicle drivetrain component with auxiliary traction motor components.

Reference is now made to FIG. 3, which shows, schematically, a vehicle drivetrain component 300 with auxiliary traction motor components. Auxiliary traction motor components 304, 306, and 308 are arranged concentrically with and between the rim and tire 301 and the drivetrain components 302. For example, a hub traction motor 304 transfers rotational torque to the wheel hub using a traction transfer component, such as a clutch, a gear and/or a differential. Energy storage and electronics 308 may surround hub traction motor 304 and allow remote operation of the hub traction motor 304. Brake, acceleration, and steering sensors 320 may be incorporated into the operator controls. The electronics and sensors allow detecting when the operator may prefer to use the electrical traction motor and subsequently operate motor 304 as needed, such as according to a rule pre-determined ahead of time or developed from heuristics.

Figure 4:
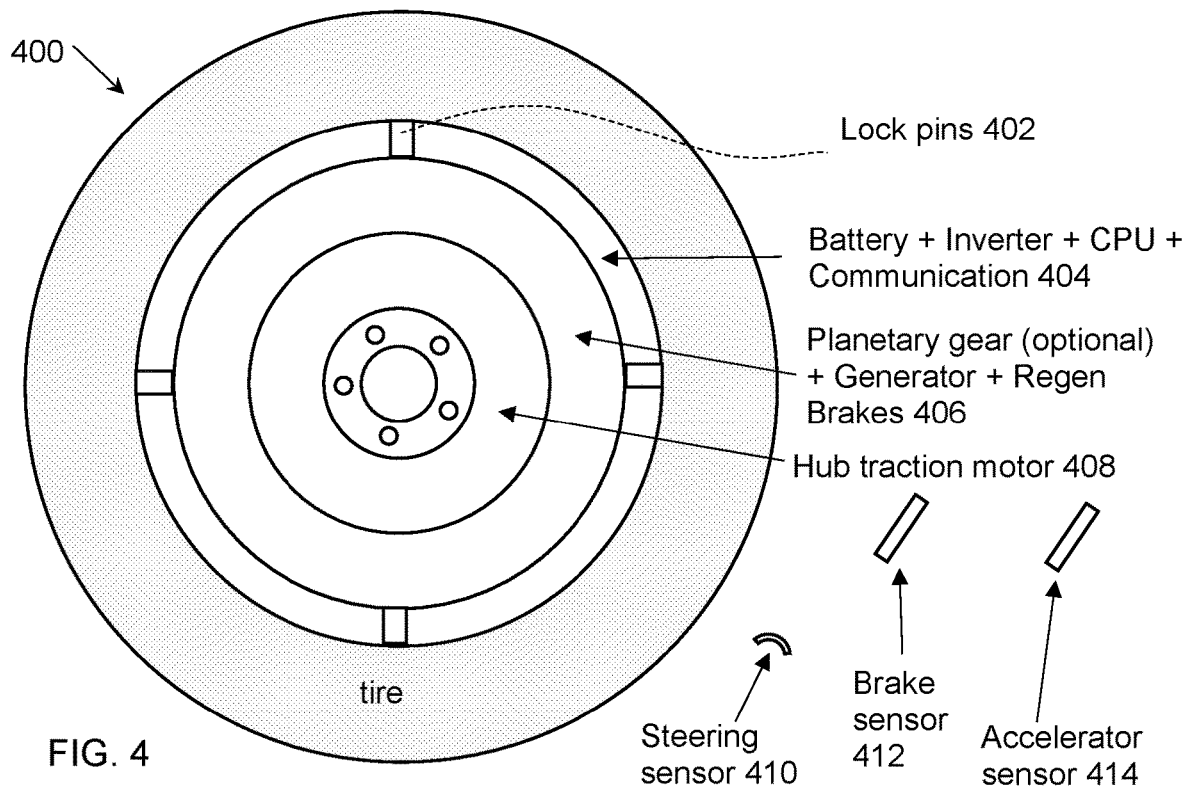
FIG. 4 shows, schematically, a vehicle wheel with auxiliary traction motor components and battery energy storage.

Reference is now made to FIG. 4, which shows, schematically, a vehicle wheel 400 with auxiliary traction motor components and battery energy storage. Vehicle wheel 400 may have a rim, tire, bolt holes, and/or hub (shown without reference). A hub traction motor 408 is connected to the central hub and a planetary gear, charger, and/or brake energy regenerator, 406 to transfer the traction from hub traction motor 408 to the rim. Lock pins 402 may be used to transfer the traction from the hub traction motor 408 to the vehicle wheel tire, such as normally engaged lock pins 402, which disengage when the hub traction motor 408 is not needed. Battery, inverter, hardware processors, and/or communication modules 404 may be disposed around the circumference of the planetary gear so that the operation of the lock pins 402 are not inhibited. A steering sensor 410, such as a motion sensor, pressure sensor, a velocity sensor, a yaw-rate sensor, a position/location sensor, an acceleration sensor, a gyroscopic sensor, a piezoelectric sensor, a magnetic field sensor, and/or an accelerometer, may be applied to a steering wheel in the operator compartment. A brake sensor 412 may be applied to the brake pedal, and an accelerator sensor 414 may be applied to the acceleration pedal.

The sensors 410, 412, 414 may record operator input to the vehicle controls and send the sensor values to a controller (such as a central processing unit or CPU) as at 404. These sensor values allow determining when the vehicle is to be operated in braking mode, when energy from the vehicle deceleration is converted to electrical energy in battery 404, such as by using a generator. The sensors allow determining when the vehicle is to be operated in electric motor mode, such that hub traction motor 408 supplies forward motion to the vehicle by engaging lock pins 402 and converting electrical energy of battery 404 to forward motion. In some circumstances, such as a traffic jam and/or stop-and-go traffic, it may be desirable to stop the operation of an ICE, and use only hub traction motor 408 for forward propulsion. In this case, the auxiliary components, such as power steering and/or power brakes, may be non-operational. In these cases, when steering sensor 410 registers an operator input to the steering and when the vehicle is operating in electrical traction motor mode, the controller may signal to a component in the engine area, such as under the bonnet, that a power steering pump is to be operated to allow operator control of the vehicle steering. Similarly, brake sensor 412 may determine that power steering should be turned on.

Figure 5:
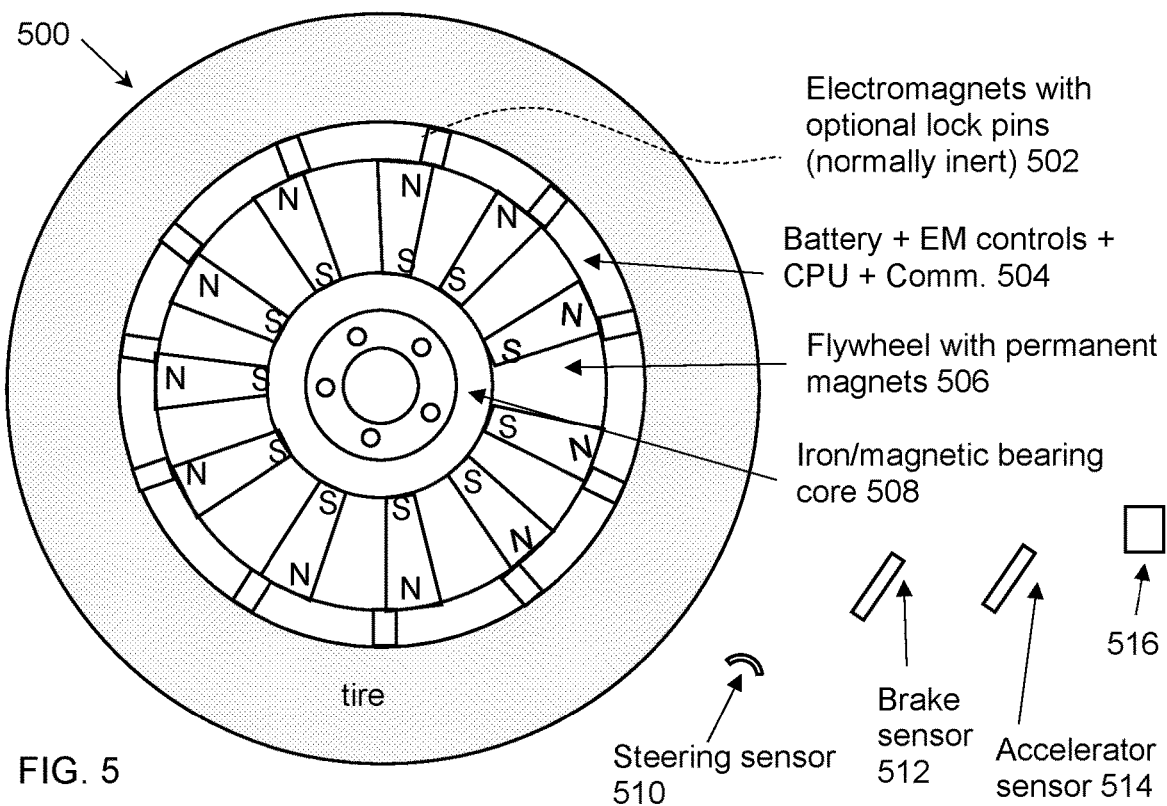
FIG. 5 shows, schematically, a vehicle wheel with auxiliary traction motor components and flywheel energy storage.

Reference is now made to FIG. 5, which shows, schematically, a vehicle wheel 500 with auxiliary traction motor components and flywheel energy storage. Energy is transferred from the vehicle motion to a flywheel 506 using for example, electromagnets (EMs) and/or lock pins 502. Flywheel 506 may incorporate permanent magnets and operate in a manner similar to a rotor of a reluctance motor. Flywheel 506 may rotate on magnetic bearings or around an iron core 508 with the permanent magnets acting as magnetic bearings. Controls, batteries for electromagnetic operation, communication modules, and/or hardware processors 504 may be located in the wheel, such as around electromagnets and/or lock pins 502. As in the aspects disclosed in FIG. 4, a steering sensor 510, a braking sensor 512, an accelerator sensor 514, and/or an ICE shutoff/startup switch 516, for example, may be used to configure the operation of the wheel 500.

Figure 6:
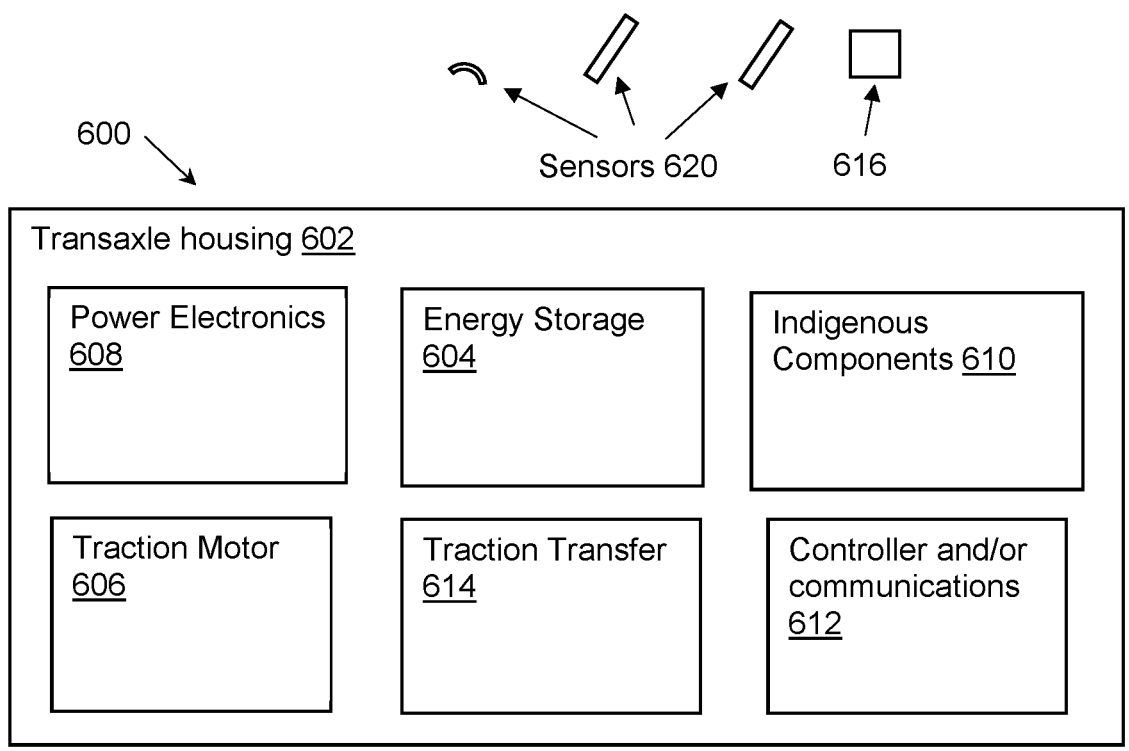
FIG. 6 shows, schematically, a vehicle transaxle with components for auxiliary traction motor.

Reference is now made to FIG. 6, which shows, schematically, a vehicle transaxle 600 with components for auxiliary traction motor. Vehicle transaxle 600 may be incorporated into a front engine, front wheel drive vehicle. Transaxle 600, or a transaxle including engine housing 602, may incorporate one or more traction motor 606, an energy storage component 604, power electronics 608, a traction transfer component 614 (such as a clutch and/or a planetary gear), and a controller and/or communication module, 612. Sensors 620 may be applied to, for example, the steering wheel, brake pedal, and/or accelerator pedal. When the ICE is retained in the vehicle as part of indigenous components 610, an auto-shutoff/auto-startup switch 616 may be applied to the ICE.

Figure 7:
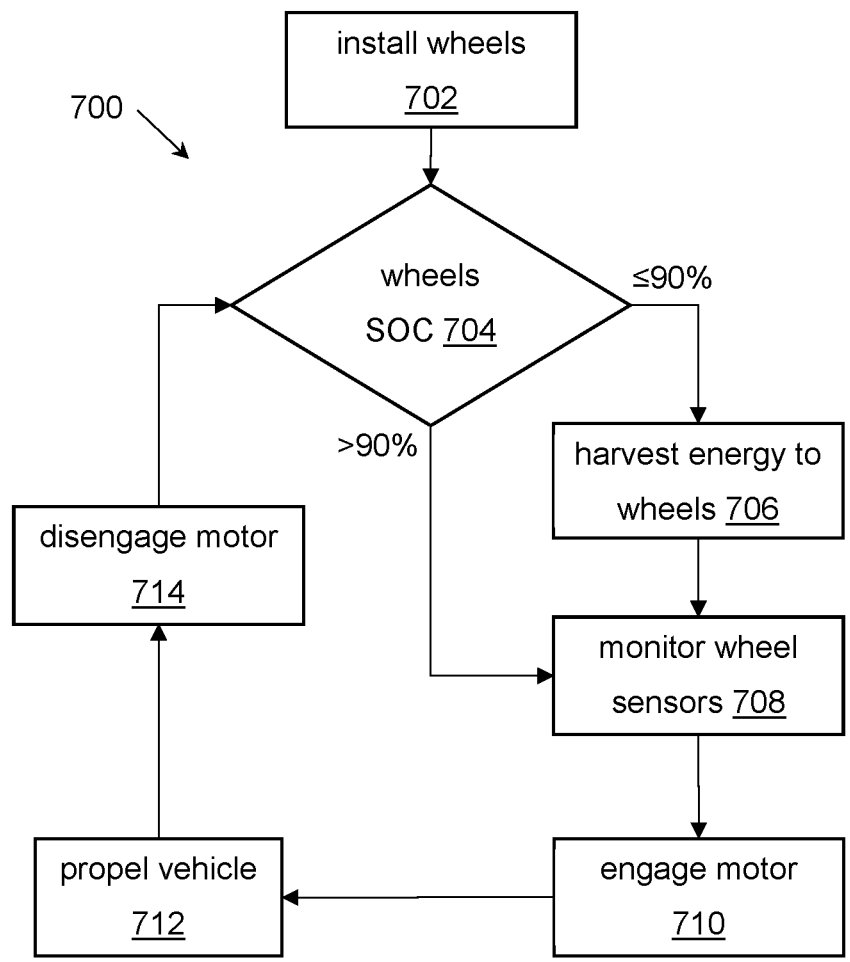
FIG. 7 shows a flowchart of a method for using an auxiliary traction motor system incorporated in a vehicle wheel.

Reference is now made to FIG. 7, which shows a flowchart 700 of a method for using an auxiliary traction motor system incorporated in a vehicle wheel. This is an example method, and limits, values, thresholds, and rules may be modified, removed, added, or replaced as needed for a specific implementation. For example, a step 702 of installing wheels may be performed by a human or machine, such as to attach wheels to a vehicle where the wheels incorporate a traction motor, energy storage, and/or energy converters. A controller may measure sensor values on the wheel to assess the state of charge, such as current sensors, accumulating current sensors, power sensors, and/or voltage sensors, and use the sensors values to perform a step 704 of evaluating the wheels state-of-charge (SOC). When the SOC of the vehicle is below a threshold, such as a 90% threshold, a step 706 of energy harvesting, such as from a momentum of the vehicle, electrical power from the vehicle (inductively, with for example electrical connection and/or wires), cable charging from a solar energy converter (cell, panel, embedded, coating, etc.), and/or inductive power from a roadway. The controller may perform the step 708 of monitoring the wheel sensors, such as a speed sensor, a pressure sensor (for example connected to a pedal), etc., and when the controller determined specific sensor values, the controller may perform the step 710 of engaging a traction motor to the wheels. The controller may initiate the energy transfer from the energy storage to the wheels thereby performing the step 712 of propelling the vehicle forward. When the monitored sensor values no longer indicate that the traction motor is needed, such as when the vehicle speed increases, the controller may perform the step 714 of disengaging the motor. The controller may monitor the SOC of the energy source and repeat steps of the illustrative method. Similar methods comprising the controller performing steps of energy harvesting 706 and traction motor engagement 710 may be implemented to meet similar use cases.

Many vehicles may be used in situations where the efficiency of the ICE is not good, such as when idling and/or during stop-and-go traffic, but no alternatives exist. For example, a Smart™ Fortwo™ vehicle may be used for urban driving only, and during a traffic jam, the ICE of the vehicle may operate at inefficient gasoline consumption levels. Retrofitting vehicles for hybrid or as battery electric vehicles (BEVs) is costly and may require extensive rewiring of the chassis, sometimes external to the vehicle, to accommodate the electric energy storage, for example in place of the gas tank. By incorporating all components of the electrical subsystem within the component being replaced, such wheels, engine, and/or transmission, some problems with retrofitting the entire vehicle are avoided. The electrical system incorporated into the components may be a simplified system with minimal performance specifications for the situations described above, such as low energy output during traffic jams, and/or cruising, and may provide sufficient energy output to achieve a significant savings in gasoline consumption.

Electrical traction motors used in electrical vehicles may typically comprise power electronics and a battery separate from the electric motor, making the direct replacement of an ICE with an electric motor challenging to fit all the components into the space previously occupied by the ICE. In modular designs, such as the designs used for commercial vehicle configuration offered by Bosch™, Voith™, and others, modules may be used, for example, for the motor, battery, and/or electronics. This allows combining the modular components for multiple vehicles/solutions/applications. In many private passenger electric vehicle designs, first generation motor designs may use modular components to decrease the development costs and time-to-market, but subsequent generations may use integration of the components for increased cost efficiency.

Integration of the inverter with motor and gear may allow cost reduction at the expense of maintenance costs, for example replacing a complete engine when a single component, such as the inverter, fails. The size, shape, and weight distribution of the EV motor may require non-linear shapes, such as heavier components being situated lower in the vehicle for better cornering ability, and lighter components, such as electronics, may be situated higher in the vehicle. Similarly, the location of components in an electric-wheel (e-wheel) may be positioned such that the lighter weight components are further distant from the axis of rotation, thereby producing, for example, a lower moment of inertia and/or less unsprung weight.

In some applications, such as marine electric motors, the requirements for protection from the marine environmental may be different for power electronics and the electric motor itself. For example, a marine ICE motor may be converted to use an electric motor or a hybrid motor that incorporates energy storage, and stores energy when the marine vehicle is slowed down, and uses the stored energy for propelling the marine vehicle. For example, the stored energy of the marine vehicle is used when docking or moving slowly.

Two motors with different operating characteristics may be been used together in a vehicle to generate more beneficial torque profiles of the motors. For example, a first electric motor (incorporated in a first wheel etc.) has an operating speed at peak efficiency of 1000 rotations per minute, and a second electric motor (incorporated in a second wheel etc.) has an operating speed at peak efficiency of 3000 rotations per minute. The first motor may be used for low speed movement and the second for high speed movement, thereby working at top efficiency at both low and high speeds. For example, a first motor has a very high torque at low speed and a second motor has medium torque at high speed. An off-road vehicle that may use this example may use the first motor when being driven in low gear and at low speed to overcome obstacles, and the second motor when being driven on the freeway. Similarly, the motors may be in two wheels for each type of motor, for example, two low speed motors in the front wheels and two high-speed motors in the rear wheels.

Configuring the electric motor to include the power electronics and other mechanics as a natural extension of the motor body may allow easier incorporation of the motor design into a vehicle design. For example, retrofit electric motors for specific purposes, such as a motor integrated into an aftermarket wheel for stopping the operation of an ICE during a traffic jam, may benefit from integrated electronics, gears, and/or multiple motors for different powers/speeds. For example, the electric motor, mechanics, energy storage, electronics, and kinetic charger may be incorporated into an aftermarket wheel/rim (e-wheel), capable of fitting many makes and models of vehicles, and accepting standard tires. Incorporating acceleration and brake pedal sensors, such as converting the pedals into two-stage pedals, light press for electric motor and heavy for ICE, etc., may allow vehicle motion without operating ICE (or keeping motor at idle in case of power steering/brake needs) and an incorporated battery during braking.

The e-wheel can be sold as an aftermarket product, and may be targeted for non-EVs to benefit from EV tech based on the time needed during stop and go traffic. Alternative configurations may include, for example, a replacement engine, a replacement transmission, a replacement transaxle, a replacement driveshaft, and/or a replacement differential. Braking friction may be transferred to a generator using lock pins in the circumference of the wheel, between the motor and rim. Lock pins may be electromechanically engaged to assist in transferring the kinetic energy between the electric motor and the wheel (such as during traction or braking). Sensors values may determine when a transition from soft (regenerative) braking to hard braking is requested by the operator.

For example, sensor values indicating moderate (less than 75%) acceleration may configure the vehicle to charge the battery by converting the vehicle's kinetic energy into electrical power. For example, light pressure on a brake pedal sensor may indicate to the vehicle's controller to configure the components to use regenerative braking to store energy for later use. A steering sensor may be used, for example, to auto-turn on the ICE when pressure is applied to the steering wheel, brake pedal, accelerator pedal, similar to the algorithms used for cruise control, and/or auto-shutoff. When an operator attempts to make a change to the vehicle, such as a change that requires the ICE to turn on, the auto-turn on device may start the ICE. This may make the turn-off transparent to the operator. Light pressure on an accelerator pedal may disengage lock pins and configure the vehicle to use the hub motor—for both slow traffic (such as in a traffic jam) and highway cruising (instead of ICE). Optional ICE auto-shutoff may need to address solutions for ancillary power such as power steering, power brakes, and/or air conditioning, when the ICE is off or idle (such as not supplying sufficient power for the equipment).

A flywheel for energy storage may incorporate a double sided mechanism, comprising outboard EMs and permanent magnets (laterally closer to the outer edge of the vehicle), and inboard ones (laterally closer to the vehicle central line). Each side of the flywheel may comprise lock pins for locking the flywheel to the wheel, hub, and/or rim. The inner side of the flywheel is connected to the outer side with an electronic controlled variable transmission that allows the two sides to rotate at different speeds while preserving angular momentum. For example, the rotational speed of inner side may be slowed down using the variable transmission (speeding up the outer side) to match the rotational speed of the axle. For example, the inner pins lock to the wheel axle, and the variable transmission may be used to transfer the momentum of the flywheel to the axle rotation. Energy may be stored as kinetic energy in the flywheel mechanism, such as a vacuum encased flywheel with magnetic bearings, and induction magnets surrounding the flywheel may convert mechanical energy of the vehicle wheel to kinetic rotational energy of the flywheel, and vice versa.

Two flywheels turning in opposite directions may be used to reduce gyroscopic forces. Transfer of wheel rotation energy to a flywheel and back may be done by magnetic fields, such as used in various kinds of electric motors. Electromagnets placed around the rim may pull or push the permanent magnets in the flywheel according to a specific order, depending on the relative rotating speeds and the configuration desired.

In a rotating frame of reference, such as a frame of reference of the flywheel 506 of FIG. 5, selective operation of the EMs may apply a magnetic pull to the permanent magnets embedded in the flywheel, such as a pull in the direction of flywheel rotation for increasing the speed of the flywheel. Conversely, the selective operation of the EMs may apply a magnetic pull on the opposite direction, transferring energy from the flywheel to the wheel. The electromagnetics may also be used as an induction generator, to trickle charge the batteries used to apply the magnetic forces to the flywheel. The spacing of the electromagnets may be different than the permanent magnet spacing on the flywheel, and electronics in the control rim determine the ordering of the electromagnet (EM) operation so that kinetic energy is added to the flywheel or removed from it. For example, a switched reluctance motor configuration may be used. For example, there could be a ten-spoke configuration of magnets on the flywheel, and nine spokes of electromagnets with pins, such that there is always an EM that may push or pull the flywheel. There may be several EMs in-phase with the flywheel permanent magnet spokes, to lock the relative rotations of the rim and flywheel. The in-phase EM can operate and lock the flywheel to the rim, so that all the mechanical rotational moment is preserved, such as during freeway coasting, and/or hypermiling. Optionally, a clutch and/or variable ratio gear is used to transfer angular momentum of the flywheel to or from the wheel rim and/or tire. The electronics for operating the EMs may be configured for high-speed operation of the EMs. For example, when the flywheel is rotating at 50,000 rotations per minute (or at 833.3 hertz), and 10 electromagnets are placed around the circumference of the flywheel, each EM be adjacent to a permanent magnet at 83.3 hertz. The time response of the electronics should be 0.1 millisecond and the slew rate for operating the EMs configured such that the full magnetization of the EM is reached between 0.1 and 1 millisecond.

Increased wheel and/or tire weight may be offset with shock absorbers and springs configured for the different wheel weight. The higher density (such as weight) components may be closer to the center of the wheel so that there is less of a moment arm on the suspension as well as less rotating weight and/or mass. Counter rotating flywheels may be used to reduce the effect of the gyroscopic forces of a rotating flywheel, and the connection between the counter rotating flywheels may be, for example, mechanical, such as mechanical gears; and/or magnetic, such as using magnetic forces or induction. Sensors on the electromagnets may detect both the angular position and speed of the flywheel to determine when more energy may be applied to the flywheel. A smartphone application may assist to control, for example, the flywheel, hub motor, and/or electric motor. For example, operational parameters of the flywheel may be viewed on the smartphone, such as the amount of energy stored, and a voice command may be received by a microphone of the smartphone, such as a command to increase the amount of stored energy by increasing the energy harvested from the wheels motion induced by the ICE.

A controller of the flywheel may access sensors outside of the wheel, such as by using Bluetooth, to determine when to use the stored energy. A communication link, such as Bluetooth, Wi-Fi, CANbus, and/or RS-485, may access other vehicle sensors, such as the acceleration and braking sensors on the pedals, visual/optical sensors on vehicle alert devices (such as Mobileye® devices), GPS sensors, traffic sensors, and/or internet data repositories. Similar communication links may be used between the wheels, or between the wheels and the control unit.

The aspects disclosed herein may be used for a full EV conversion for old cars with no engines, using string batteries snaked into the fuel tank, plugged in at the motor/inverter, wires strapped to body outside vehicle (to transfer power from the batteries in the fuel tank to the engine), and an engine-to-motor mechanical conversion kit. Alternatively, batteries may be incorporated in the vehicle to replace the transmission and/or transaxle.

Following are calculations for use of auxiliary electrical traction motors in a traffic jam. For the calculation, it is assumed that the traffic jam is over a distance of 10 kilometer (km) and the vehicles are travelling at 10 km per hour (km/h), such as during a one-hour traffic jam. For example, current electrical traction motor efficiency at 10 km/h may be 130 watt-hour (Wh) per km (Wh/km), so a total capacity of 1300 Wh is needed. For Li-ion batteries, energy density may be about 260 Wh/kilogram (Kg), so the batteries will weight 5 Kg, or 1.25 Kg per wheel. If a flywheel energy storage is used the density is 130 Wh/Kg, and therefore, a based flywheel system would weigh 10 Kg, or 2.5 Kg per wheel. In addition, a 200 W solar panel on roof may supply enough power for the vehicle motion during a traffic jam. A solar car cover may also be incorporated into the system. One option for the design of the e-wheel incorporating the aspects disclosed, is shown in the following table:

TABLE 1 weights of electric battery example wheel components

| e-Wheel components | Weight |
| --- | --- |
| Battery | 1.5 Kg |
| Motor | 2 Kg |
| Electronics | 1 Kg |
| Structural | 2 Kg |
| Gear | 2 Kg |
| Total | 8.5 Kg extra over regular wheel |

To confirm that this extra weight is acceptable, wheel and tire weight variations have been analyzed and simulated. For example, an original equipment (OE) BMW 3 series wheel weighs 20.5 pounds each, while an OE Michelin Energy MXV4 Plus tire weighs 22.5 pounds each, arriving at a total of 43.0 pounds for each tire including the wheel.

Lightweight wheels on the other hand may weigh as little as 17 pounds each, reaching a total of 38.5 pounds per wheel plus tire (2 Kg less). Heavyweight wheels and tires may together weigh 48.5 pounds (about 3 Kg more than stock, 5 Kg more than lightweight). Wheels with larger rims may weight more, such as 54 pounds for wheels with 19" rims versus 40 pounds for wheels with 15" rims (7 Kg difference).

In a second scenario, an electrical traction motor has a power density of 1.5 kW/Kg, which is about 2 horsepower (hp)/Kg. Below 5 km/h, the efficiency may be 100 Wh/km, and at a speed of 10 km/h, the efficiency may be 50 Wh/km. For a 10 km traffic jam, the vehicle will need about 500 Wh of battery capacity (or energy storage of 125 Wh in each wheel). Thus a 750 W motor per wheel will produce about 1 hp at each wheel and weigh 500 grams per wheel. Consequently, a low efficiency 1.5 hp motor for traffic jams in each wheel may weigh up to 1 Kg, 500 Wh of energy storage may weigh 2 Kg, structural components may weigh 1 Kg, and electronics may weigh 1 Kg. So totals for each wheel are shown in the following table:

TABLE 2 weights of flywheel example wheel components

| e-Wheel components | Weight |
| --- | --- |
| Battery | 2 Kg (500 Wh, 1 L) (4 Kg flywheel) |
| Motor | 1 Kg (1.5 hp, @ 5 kW/liter = 0.3 L) |
| Electronics | 1 Kg (charge discharge at 3 C = 1.5 kW) |
| Structural | 2 Kg |
| Gear | 1 Kg |
| Total | 7 Kg extra over regular wheel |

When a lightweight rim, wheel, and tire are used for an auxiliary traction device, the conversion kit may weigh less than or equal to the OE wheel and tire combination.

Sensors may be used for the operator controls, such as gyroscopic sensors, motion sensors, speed sensors, global positioning system sensors, optical sensors, and/or magnetic field sensors. The sensors may be located at the interface between a vehicle control and the operator, such that when the operator operates the vehicle, the dual sensors and controls may allow the controls to be a direct management of the ICE and the sensors allow a fly-by-wire control with the electrical traction motor and components.

Here, as elsewhere in the specification and claims, ranges may be combined to form larger ranges.

Specific dimensions, specific materials, specific ranges, specific resistivities, specific voltages, specific shapes, and/or other specific properties and values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter. For example, the disclosure of a first value and a second value for a given parameter can be interpreted as disclosing that any value between the first and second values could also be employed for the given parameter. For example, if parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

In the description of various illustrative features, reference is made to the accompanying drawings, which form a part hereof, and in which is shown, by way of illustration, various features in which aspects of the disclosure may be practiced. It is to be understood that other features may be utilized and structural and functional modifications may be made, without departing from the scope of the present disclosure.

Terms such as "multiple" as used in this disclosure indicate the property of having or involving several parts, elements, or members.

It may be noted that various connections are set forth between elements herein. These connections are described in general and, unless specified otherwise, may be direct or indirect; this specification is not intended to be limiting in this respect, and both direct and indirect connections are envisioned. Further, elements of one feature in any of the embodiments may be combined with elements from other features in any of the embodiments, in any combinations or sub-combinations.

All described features, and modifications of the described features, are usable in all aspects of the inventions taught herein. Furthermore, all of the features, and all of the modifications of the features, of all of the embodiments described herein, are combinable and interchangeable with one another.

What is claimed is:

1. An apparatus comprising: a wheel for a vehicle comprising:
    at least one energy storage component within the wheel; and at least one traction component within the wheel, at least one sensor, and at least one controller, wherein the controller is configured to monitor values of the at least one sensor, and responsive to the values, direct a conversion of energy between the at least one energy storage component and the at least one traction component, and wherein the controller is configured to convert kinetic energy from the at least one traction component to electrical energy stored in the at least one energy storage component when the vehicle is not braking, wherein the at least one sensor comprises at least one acceleration sensor selected from the group consisting of a pressure sensor, a motion sensor, an accelerometer, and a piezoelectric sensor, and wherein the at least one acceleration sensor is responsive to a first operator input, wherein when said first operator input is applied to the at least one acceleration sensor below a threshold speed of the vehicle, the at least one traction component is signaled to transfer energy from the at least one energy storage component to a forward propulsion of a vehicle, and wherein when said first operator input is applied to the at least one acceleration sensor above a threshold speed of the vehicle, the at least one traction component is signaled to transfer energy to the at least one energy storage component.

2. The apparatus of claim 1, wherein the at least one sensor comprises:
    at least one deceleration sensor selected from the group consisting of a pressure sensor, a motion sensor, an accelerometer, and a piezoelectric sensor,
    wherein the at least one deceleration sensor is responsive to a second operator input, and wherein when said second operator input is applied to the at least one deceleration sensor, the at least one traction component is signaled to transfer energy to the at least one energy storage component from the forward propulsion of the vehicle.

3. The apparatus of claim 1, wherein the wheel comprises at least one energy harvesting device within the wheel and separate from the at least one traction component, wherein the at least one energy harvesting device is configured to send energy to the at least one energy storage component when the vehicle is accelerating.

4. The apparatus of claim 1, further comprising an out-of-wheel storage component.

5. The apparatus of claim 2, wherein the vehicle is an internal combustion engine (ICE) vehicle, a hybrid-electric vehicle (HEV), or an electric vehicle (EV).

6. The apparatus of claim 1, wherein the at least one sensor comprises a transverse acceleration sensor for providing a measurement of transverse forces on a vehicle.

7. The apparatus of claim 1, wherein the at least one controller is further configured to process the values and calculate a power to provide to each of a plurality of traction components in a plurality of vehicle wheels.

8. The apparatus of claim 1, wherein the at least one energy storage component is selected from the group consisting of a secondary battery, a flywheel, a compressed gas energy storage, a supercapacitor, and a fuel cell.

9. A method for electrical traction of a vehicle comprising, using a hardware controller to:
monitor a plurality of values received from at least one sensor; and
responsive to the plurality of values, direct a flow of energy between at least one energy storage component and at least one traction component, wherein the at least one energy storage component and at least one traction component are located inside a wheel, and wherein kinetic energy is converted from the at least one traction component to electrical energy stored in the at least one energy storage component when a is not braking,
wherein the at least one sensor comprises at least one acceleration sensor selected from the group consisting of a pressure sensor, a motion sensor, an accelerometer, and a piezoelectric sensor, and wherein the at least one acceleration sensor is responsive to a first operator input, wherein when said first operator input is applied to the at least one acceleration sensor, the at least one traction component is signaled to transfer energy from the at least one energy storage component to a forward propulsion of a vehicle, and wherein when said first operator input is applied to the at least one acceleration sensor above a threshold speed of the vehicle, the at least one traction component is signaled to transfer energy to the at least one energy storage component.

10. The method of claim 9, wherein the at least one sensor comprises:
at least one deceleration sensor selected from the group consisting of a pressure sensor, a motion sensor, an accelerometer, and a piezoelectric sensor,
wherein the at least one deceleration sensor is responsive to a second operator input, and wherein when said second operator input is applied to the at least one deceleration sensor, the at least one traction component is signaled to transfer energy to the at least one energy storage component from the forward propulsion of the vehicle.

11. The method of claim 9, further comprising converting kinetic energy of the vehicle using at least one energy transfer component and the at least one traction component to electrical energy stored, and storing the electrical energy in the at least one energy storage component.

12. The method of claim 11, wherein at the energy transfer component comprises least one energy harvesting device within the wheel that is configured to convert the kinetic energy to electrical energy when the vehicle is accelerating.

13. The method of claim 9, wherein the at least one sensor comprises at least one steering sensor from the group consisting of a pressure sensor, a motion sensor, and a piezoelectric sensor, wherein the at least one steering sensor is responsive to an operator steering input, and wherein when said operator steering input is received, at least one controller signals the vehicle to enable power to a power steering of the vehicle.

14. The method of claim 9, wherein the at least one energy storage component is selected from the group consisting of a secondary battery, a flywheel, a compressed gas energy storage, a super-capacitor, and a fuel cell.

15. A kit comprising:
one or more electrical traction wheels for a vehicle, each wheel comprising:
at least one energy storage component within the wheel; and
at least one traction component within the wheel,
at least one sensor, and
at least one controller, wherein the controller is configured to monitor values of at least one sensor, and responsive to the values, convert kinetic energy from the at least one traction component to electrical energy stored in the at least one energy storage component when the vehicle is not braking,
wherein the at least one sensor comprises at least one acceleration sensor selected from the group consisting of a pressure sensor, a motion sensor, an accelerometer, and a piezoelectric sensor, and wherein the at least one acceleration sensor is responsive to a first operator input, wherein when said first operator input is applied to the at least one acceleration sensor, the at least one traction component is signaled to transfer energy from the at least one energy storage component to a forward propulsion of a vehicle, and wherein when said first operator input is applied to the at least one acceleration sensor above a threshold speed of the vehicle, the at least one traction component is signaled to transfer energy to the at least one energy storage component.

16. The kit of claim 15, wherein the at least one sensor comprises:
at least one deceleration sensor selected from the group consisting of a pressure sensor, a motion sensor, an accelerometer, and a piezoelectric sensor,
wherein the at least one deceleration sensor is responsive to a second operator input, and wherein when said second operator input is applied to the at least one deceleration sensor, the at least one traction component is signaled to transfer energy to the at least one energy storage component from the forward propulsion of the vehicle.

17. The kit of claim 16, further comprising at least one energy transfer component within the wheel, wherein the at least one energy transfer component converts kinetic energy between the at least one traction component and to electrical energy stored in the at least one energy storage component.

18. The kit of claim 17, wherein the at least one energy transfer component comprises at least one energy harvesting device within the wheel, wherein the at least one energy harvesting device sends energy to the at least one energy storage component when the vehicle is accelerating.

19. The kit of claim 16, further comprising at least one steering sensor from the group consisting of a pressure sensor, a motion sensor, and a piezoelectric sensor, wherein the at least one steering sensor is responsive to an operator steering input, and wherein when said operator steering input is received, the at least one controller signals the vehicle to enable power to a power steering of the vehicle.

20. The kit of claim 16, wherein the kit at least in part is incorporated into a drivetrain component of the vehicle.

* * * * *